(12) United States Patent
Hashimoto et al.

(10) Patent No.: US 6,419,267 B1
(45) Date of Patent: Jul. 16, 2002

(54) AIR BAG DEVICE

(75) Inventors: Syuzo Hashimoto, Mishima; Masakazu Chiba, Numazu, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/547,721

(22) Filed: Apr. 12, 2000

(30) Foreign Application Priority Data

Apr. 13, 1999  (JP) .......................................... 11-105611

(51) Int. Cl.$^7$ .............................................. B60R 21/16
(52) U.S. Cl. .................. 280/743.1; 280/729; 280/743.2
(58) Field of Search ............................... 280/729, 743.1, 280/743.2, 739, 742, 738, 731

(56) References Cited

U.S. PATENT DOCUMENTS

| | | | | |
|---|---|---|---|---|
| 5,249,824 A | * | 10/1993 | Swann et al. ................ | 280/729 |
| 5,282,646 A | * | 2/1994 | Melvin et al. ............... | 280/729 |
| 5,338,061 A | * | 8/1994 | Nelson et al. .............. | 280/729 |
| 5,489,117 A | * | 2/1996 | Huber ........................ | 280/738 |
| 5,927,748 A | | 7/1999 | O'Driscoll | |
| 5,951,038 A | * | 9/1999 | Taguchi et al. ............. | 280/729 |
| 6,086,092 A | * | 7/2000 | Hill ............................ | 280/729 |

FOREIGN PATENT DOCUMENTS

| | | |
|---|---|---|
| JP | 3-52265 | 5/1991 |
| JP | 9-48307 | 2/1997 |
| JP | 10-44914 | 2/1998 |
| JP | 10-71904 | 3/1998 |
| JP | 10-71920 | 3/1998 |
| JP | 2761350 | 3/1998 |
| JP | 10-203280 | 8/1998 |

OTHER PUBLICATIONS

Abstract of Japanese Laid–open Publication No. 04–244453.
Abstract of Japanese Laid–open Publication No. 01–311930.
Abstract of Japanese Laid–open Publication No. 03–281460.
Abstract of Japanese Laid–open Publication No. 05–131889.

* cited by examiner

Primary Examiner—Kenneth R. Rice
Assistant Examiner—Christopher Buchanan
(74) Attorney, Agent, or Firm—Finnegan, Henderson, Farabow, Garrett & Dunner, L.L.P.

(57) ABSTRACT

There is provided an air bag device of the present invention which allows generation of suitable reaction force which corresponds to a physical constitution of a vehicle occupant abutting against an air bag body. In the air bag device, a region of an outer air bag body pressed by the vehicle occupant abuts an inner air bag body and closes vent holes formed in the inner air bag body. Therefore, a quantity of gas flowing from the inner air bag body into a space formed between the outer air bag body and the inner air bag body can be controlled. Accordingly, the quantity of gas flowing through the vent holes into the space and further escaping from the air bag body via vent holes formed in the outer air bag body can be adjusted in accordance with a physical constitution of the vehicle occupant abutting against the air bag body.

14 Claims, 6 Drawing Sheets

AIR BAG DEVICE

BACKGROUND OF THE INVENTION

1. Field of the Invention

The present invention relates to an air bag device, and particularly to an air bag device provided in vehicles such as automobiles and expanding to unfold in an interior of the vehicle so as to protect a vehicle occupant.

2. Description of the Related Art

Heretofore, an example of an air bag device provided in vehicles such as automobiles and expanding to unfold in an interior of the vehicle so as to protect a vehicle occupant has been disclosed in Japanese Utility Model Application Laid-Open (JP-U) No. 3-52265.

Figure 6:
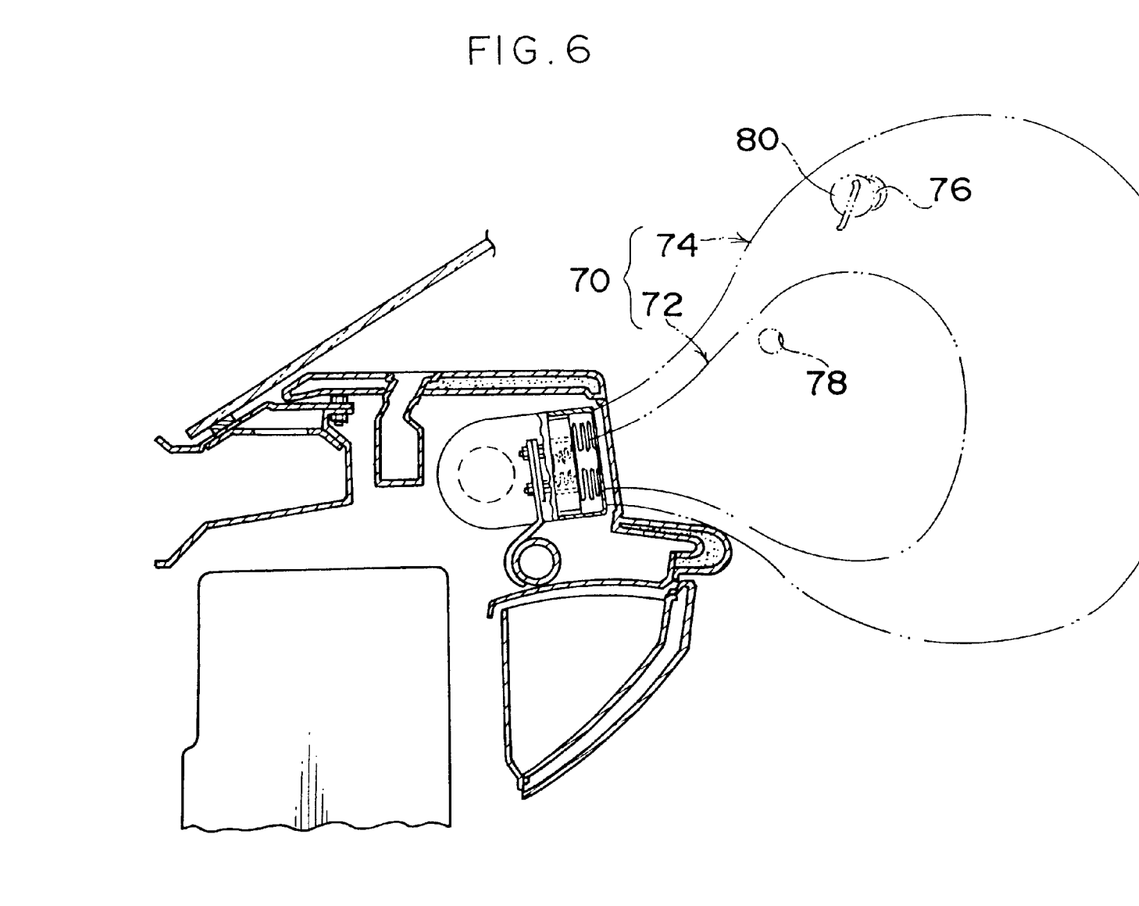
FIG. 6 is a side cross sectional view which shows a conventional air bag device.

In an air bag device as shown in FIG. 6, an air bag body 70 is formed so as to have a double structure comprised of an inner air bag body 72 and an outer air bag body 74. A large vent hole 76 is formed in the outer air bag body 74 and a small vent hole 78 is formed in the inner air bag body 72. The vent hole 76 formed in the outer air bag body 74 is provided with a lid 80. The lid 80 closes the vent hole 76 until expansion (unfolding) of the outer air bag body 74 is substantially completed, and the lid 80 opens the vent hole 76 after the expansion of the outer air bag body 74 has been substantially completed. As a result, in a case in which a vehicle occupant abuts against the air bag body 70 after the expansion of the outer air bag body 74 has been substantially completed, reaction force is applied from the air bag body 70 to the vehicle occupant, and the vehicle occupant is protected.

In the above-described air bag device, as shown in FIG. 6, the small vent hole 78 is formed in the inner air bag body 72 and the large vent hole 76 is formed in the outer air bag body 74. Therefore, the quantity of gas which is allowed to pass through the vent holes 76 and 78 cannot be controlled in accordance with a physical constitution of a vehicle occupant abutting against the air bag body 70. As a result, in the air bag device shown in FIG. 6, reaction force applied from the air bag body 70 to the vehicle occupant when the vehicle occupant abuts against the air bag body 70 is made most suitable only for a vehicle occupant of a standard (average) physical constitution.

SUMMARY OF THE INVENTION

In view of the above-described facts, an object of the present invention is to provide an air bag device in which proper reaction force corresponding to a physical constitution of a vehicle occupant abutting against an air bag body can be generated.

In accordance with a first aspect of the present invention, there is provided an air bag device having an air bag body which expands to unfold in an interior of a vehicle, the air bag body comprising: an outer air bag body having vent holes communicating with an exterior of the air bag body; and an inner air bag body having a capacity smaller than that of the outer air bag body and unfolding in an interior of the outer air bag body, wherein the inner air bag body is formed so as to have a high gas permeability, and when a vehicle occupant abuts against the outer air bag body, a portion of the outer air bag body pressed by the vehicle occupant abuts the inner air bag body so as to control a quantity of gas flowing from the inner air bag body into the outer air bag body.

Accordingly, in a case in which the vehicle occupant abuts against the outer air bag body after the air bag body has unfolded, a portion of the outer air bag body pressed by the vehicle occupant abuts the inner air bag body and the quantity of gas flowing from the inner air bag body into the space formed between the inner air bag body and the outer air bag body is controlled. As a result, the quantity of gas flowing from the inner air bag body to the outer air bag body changes in accordance with a physical constitution of the vehicle occupant abutting against the air bag body, and the quantity of gas escaping from the vent holes of the outer air bag body to an exterior of the air bag body also changes due to the same reason. Namely, in a case in which a small-built vehicle occupant abuts against the outer air bag body, an area of a portion at which the outer air bag body and the inner air bag body abut each other is small and a region of the inner air bag body through which gas is allowed to pass becomes wide. Therefore, the quantity of gas flowing from the inner air bag body into the space between the inner air bag body and the outer air bag body increases and the quantity of gas escaping from the vent holes of the outer air bag body to an exterior of the air bag body also increases. As a result, it is possible to prevent reaction force, which is applied from the air bag body to the vehicle occupant when the vehicle occupant abuts against the air bag body, from unnecessarily becoming large (from becoming larger than desired one). On the other hand, in a case in which a largely-built vehicle occupant abuts against the outer air bag body, an area of a portion at which the outer air bag body and the inner air bag body abut each other is large and a region of the inner air bag body through which gas is allowed to pass becomes smaller. Therefore, the quantity of gas flowing from the inner air bag body into the space between the inner air bag body and the outer air bag body decreases and the quantity of gas escaping from the vent holes of the outer air bag body to an exterior of the air bag body also decreases. As a result, it is possible to prevent reaction force, which is applied from the air bag body to the vehicle occupant when the vehicle occupant abuts against the air bag body, from unnecessarily becoming smaller (from becoming smaller than desired one). In other words, suitable reaction force can be generated correspondingly to the physical constitution of the vehicle occupant abutting against the air bag body.

Further, according to a second aspect of the present invention, in the air bag device provided by the first aspect, the inner air bag body is made of a cloth material having a large number of vent holes formed therein.

Accordingly, in addition to the structure provided by the first aspect of the present invention, it suffices that a large number of vent holes be formed an inner air bag body. As a result, suitable reaction force can be generated by a simple structure so as to correspond to the physical constitution of the vehicle occupant abutting against the air bag body.

In accordance with a third aspect of the present invention, in the air bag device provided by the first aspect, the inner air bag body is made of a cloth material having a high gas permeability.

Accordingly, in addition to the structure provided by the first aspect of the present invention, it suffices that an inner air bag body be made of a cloth material having a high gas permeability. As a result, suitable reaction force can be generated by a simple structure so as to correspond to the physical constitution of the vehicle occupant abutting against the air bag body.

Still further, in accordance with a fourth aspect of the present invention, there is provided an air bag device having an air bag body which unfolds in an interior of a vehicle, the air bag body comprising: an outer air bag body; and an inner air bag body having a capacity smaller than that of the outer air bag body and unfolding in an interior of the outer air bag body, wherein the outer air bag body includes at least one first hole formed therein, and the inner air bag body includes communication means which is formed at least on a facing surface thereof substantially facing a vehicle occupant at the time of unfolding the air bag body, the communication means being provided to allow communication between an interior of the inner air bag body and a space formed between the inner air bag body and the outer air bag body.

DESCRIPTION OF THE PREFERRED EMBODIMENTS

An air bag device according to an embodiment of the present invention will be hereinafter described with reference to FIGS. 1 to 4.

Note that arrows "UP", "FR", and "IN" shown in the drawings respectively represent: the upward direction of a vehicle; the forward direction of the vehicle; and an inward direction of the vehicle relative to a transverse axis thereof.

Figure 4:
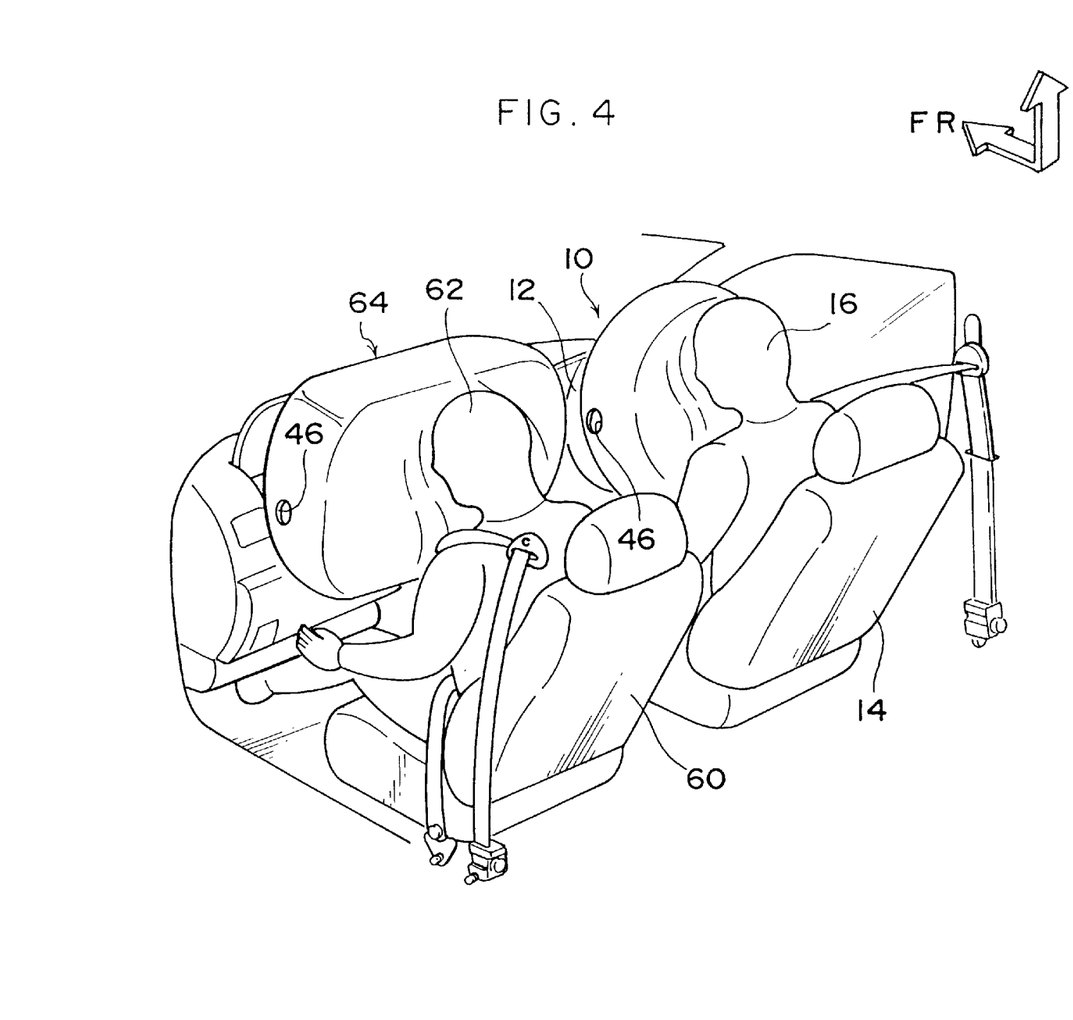
FIG. 4 is a perspective view when seen diagonally from the rear side of a vehicle, illustrating a vehicle-interior front side of the vehicle to which the air bag device according to the embodiment of the present invention is applied.

As illustrated in FIG. 4, an air bag device 10 according to the present embodiment is disposed at a steering wheel 12 and is provided as an air bag device for a driver's seat in which an air bag expands in a front region of a vehicle occupant 16 seated at a driver's seat 14 so as to protect the vehicle occupant 16.

Figure 1:
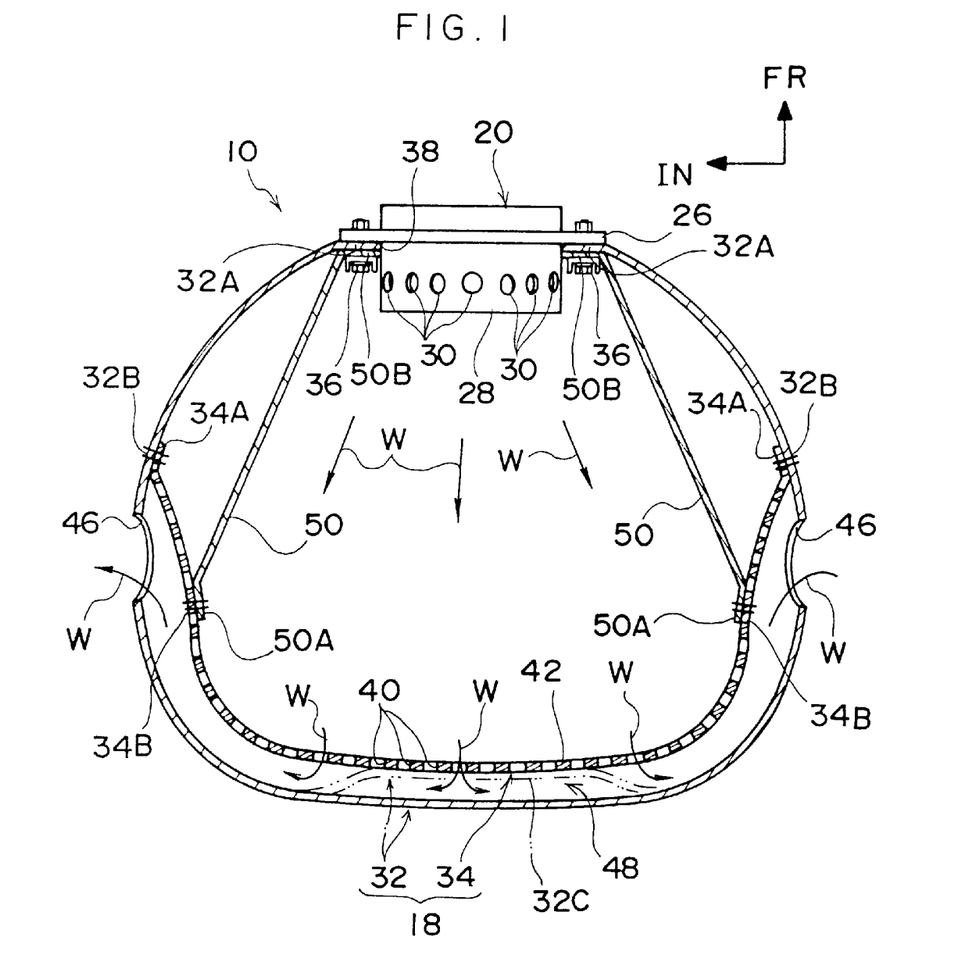
FIG. 1 is a plane cross sectional view showing an air bag device according to an embodiment of the present invention.

As illustrated in FIG. 1, the air bag device 10 is equipped with an air bag body 18 and an inflator 20. The inflator 20 is fixed via a base plate (not shown) to a hub provided at a core bar of the steering wheel 12 (see FIG. 4) and is mounted inside the steering wheel 12.

A flange 26 is formed at an intermediate portion of the inflator 20 in the axial direction so as to extend outward in a radial direction of the inflator 20. The flange 26 is fixed to the base plate by a bolt (not shown).

An actuating device, a detonator, a booster, a gas generating material, a filter, and the like (which are all not shown) are accommodated within the inflator 20. The actuating device operates to cause the detonator to ignite, and the gas generating material is burnt via the booster. As a result, a large quantity of gas can be generated within the inflator 20.

A portion of the inflator 20 which faces a vehicle occupant (that is, a lower portion of the inflator 20 in FIG. 1) is formed as a gas blowout portion 28. A plurality of circular gas blowout holes 30 are formed on a peripheral surface of the gas blowout portion 28 at predetermined intervals. Gas generated within the inflator 20 is blown out from the gas blowout holes 30 outside the inflator 20.

An air bag body 18 is accommodated in a folded manner at a vehicle-occupant side of the inflator 20 (at the lower side of the inflator 20 on the paper of FIG. 1), and the air bag body 18 expands to unfold due to pressure of gas from the inflator 20.

Figure 2:
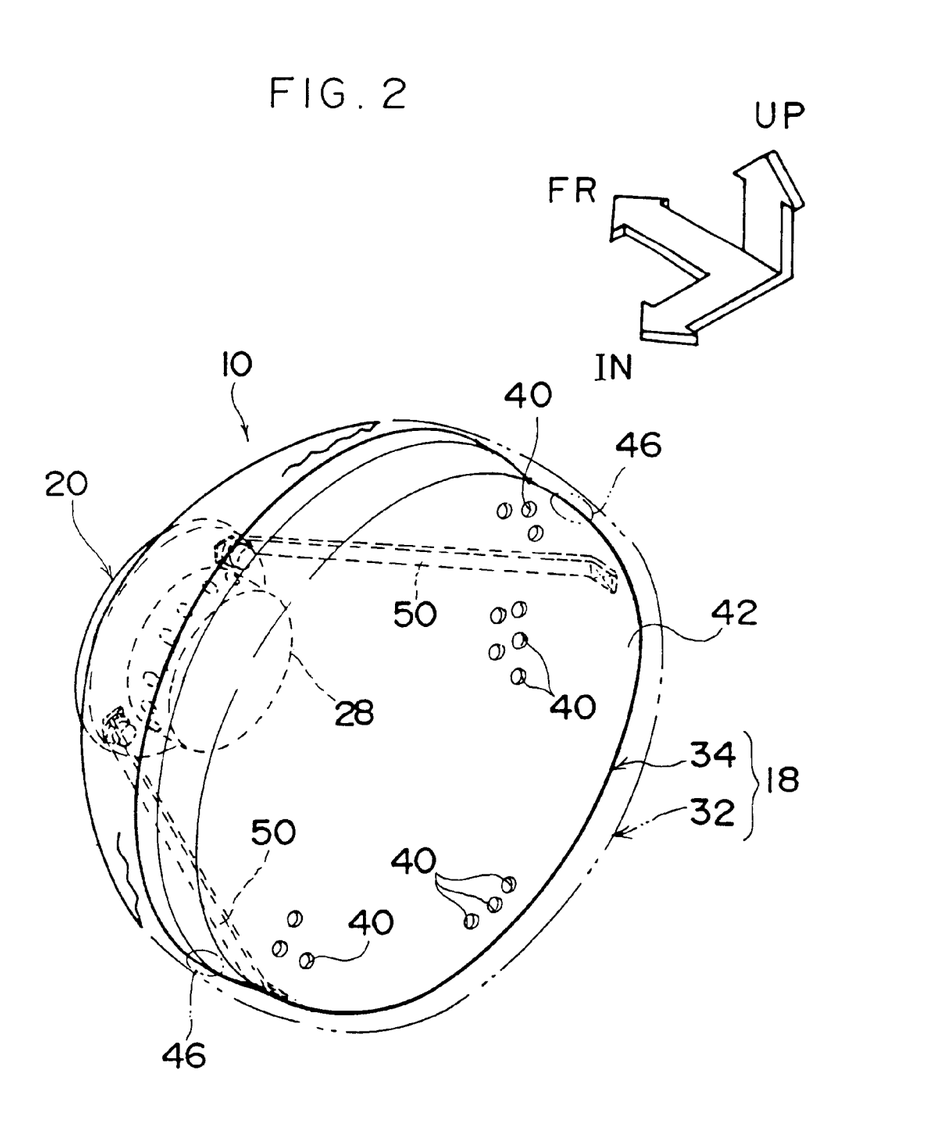
FIG. 2 is a perspective view showing the air bag device according to the embodiment of the present invention when seen from a vehicle-interior side and also diagonally from a rear side of a vehicle.

As shown in FIG. 2, the air bag body 18 is formed as a double structure comprised of a large-capacity outer air bag body 32 which forms an outer side of the air bag body 18, and a small-capacity inner air bag body 34 which forms an inner side of the air bag body 18.

As shown in FIG. 1, an outer peripheral edge 32A of the outer air bag body 32 is fixed to the flange 26 of the inflator 20 by fixing members 36 such as bolts. A circular opening 38 is formed in the outer air bag body 32 so as to correspond to the inflator 20, and the gas blowout portion 28 of the inflator 20 passes through the circular opening 38.

An outer peripheral edge 34A of the inner air bag body 34 is fixed by stitching or the like to a connecting portion 32B of the outer air bag body 32 apart from the outer peripheral edge 32A by a predetermined distance. The inner air bag body 34 is formed so as to have a high gas permeability. Specifically, the inner air bag body 34 is formed of a cloth material 42 in which a large number of vent holes 40 are provided, and gas blown out from the inflator 20 is allowed to pass through the vent holes 40. Accordingly, when the air bag body 18 unfolds, first, the inner air bag body 34 and the outer air bag body 32 expands to unfold due to the gas from the inflator 20 (indicated by arrow W in FIG. 1) substantially in an integrated manner. After the inner air bag body 34 has completely unfolded, gas flowing through the vent holes 40 causes the outer air bag body 34 to further expand to unfold. As a result, the air bag body 18 is finally brought into a state of expanding to unfold to form a double structure shown in FIG. 1.

On the other hand, when a vehicle occupant abuts against the outer air bag body 32, as shown in the two-dot chain lines in FIG. 1, a region of the outer air bag body 32 pressed by the vehicle occupant abuts a portion of the inner air bag body 34 and some of the vent holes 40 formed in the inner air bag body 34 are closed. As a result, the quantity of gas flowing from the inner air bag body 34 into a space 48 formed between the outer air bag body 32 and the inner air bag body 34 can be controlled.

A vent hole 46 communicating with an exterior of the air bag body 18 is formed at each of positions in both side portions of the outer air bag body 32 (that is, in both ends of the outer air bag body 32 in the transverse direction of a vehicle at the time of the unfolding), the each of the positions is located nearer toward the vehicle occupant than the connecting portion 32B (which positions are each located at the lower side of the connecting portion 32B in FIG. 1). Accordingly, gas flowing through the vent holes 40 and into the space 48 between the outer air bag body 32 and the inner air bag body 34 is allowed to escape outside the air bag body 18 via the vent holes 46.

One end 50A of each of band-shaped straps 50 is fixed by stitching or the like at a portion 34B of the inner air bag body 34 substantially facing the corresponding vent hole 46. Another end 50B of each strap 50 is fixed to the flange 26 of the inflator 20 in such a manner as to be fastened together with the flange 26 by a fixing member 36 such as a bolt. When the air bag body 18 is brought into an unfolding state (see FIG. 1), these straps 50 each stretch to its full length (the state shown in FIG. 1). Therefore, there is little possibility that the inner air bag body 34 abuts against peripheries of the vent holes 46 formed in the outer air bag body 32 so as to prevent the gas, which flows into the space 48 between the outer air bag body 32 and the inner air bag body 34, from escaping outside the air bag body 18 via the vent holes 46.

Next, an operation of the present embodiment will be described.

In the present embodiment, when a vehicle rapidly decelerates, the actuating device of the inflator 20 operates to cause the detonator to ignite, and the gas generating material is burnt via the booster. As a result, a large quantity of gas is generated within the inflator 20. The gas generated within the inflator 20 is blown out from the gas blowout holes 30 so as to expand to unfold the air bag body 18. Fragments or the like produced during the combustion are removed by the filter. In this case, the inner air bag body 34 and the outer air bag body 32 of the air bag body 18, first, expand to unfold substantially in an integrated manner due to the gas from the inflator 20 (indicated by arrow W in FIG. 1). After the inner air bag body 34 has completely unfolded, the gas flowing through the vent holes 40 causes the outer air bag body 32 to further expand to unfold. As a result, the air bag body 18 is finally brought into a state of expanding to unfold to form the double structure shown in FIG. 1.

Next, as indicated by the two-dot chain lines in FIG. 1, when the vehicle occupant abuts against the completely unfolded air bag body 18, an abutting portion 32C of the outer air bag body 32 pressed by the vehicle occupant abuts against a portion of the inner air bag body 34 (an abutted portion), and the vent holes 40 disposed in the abutted portion of the inner air bag body 34 against which the abutting portion 32C pressed by the vehicle occupant abuts are closed. Therefore, the quantity of gas flowing from the inner air bag body 34 into the space 48 is controlled (restricted). As a result, the quantity of gas flowing from the inner air bag body 34 into the space 48 changes in accordance with a physical constitution of the vehicle occupant 16 abutting against the outer air bag body 32, accordingly, the quantity of gas escaping from the vent holes 46 of the outer air bag body 32 outside the air bag body also changes.

Figure 3A:
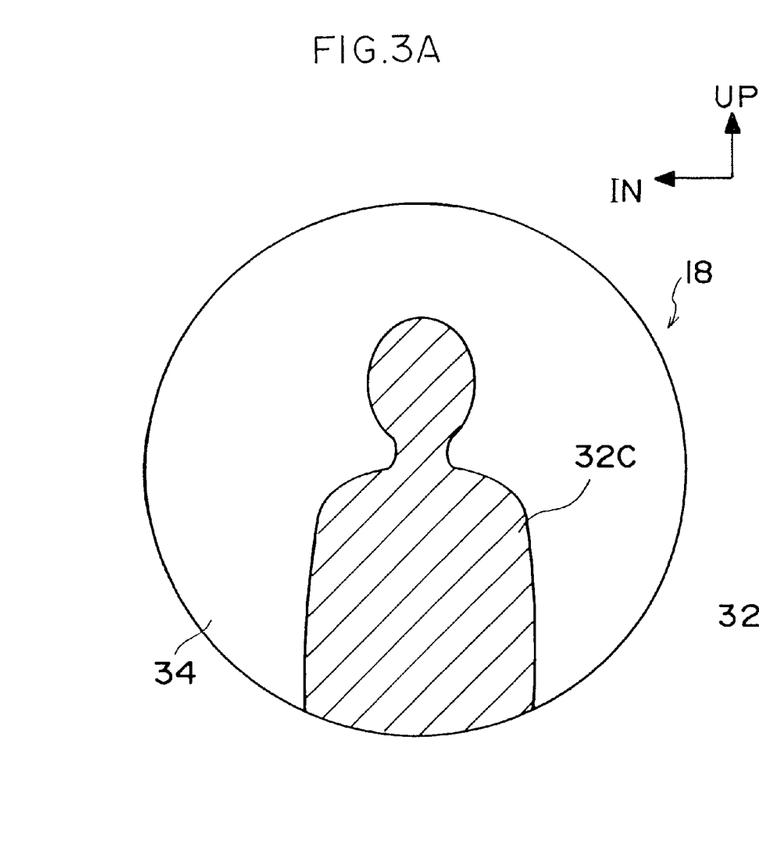
FIG. 3A is a drawing for illustration of an operation in a case in which a small-built vehicle occupant abuts against the air bag device according to the embodiment of the present invention.

In other words, as shown in FIG. 3A, in a case in which a small-built vehicle occupant abuts against the outer air bag body 32, an area of the abutting portion 32C of the outer air bag body 32 on the inner air bag body 34 (indicated by the slanting lines in FIG. 3A) is small and the number of vent holes 40 closed by the abutting portion 32C is also small. Therefore, there remains a wide region in which gas is allowed to flow through, that is, there remains a large number of vent holes 40 through which gas is allowed to flow. As a result, the quantity of gas flowing from the inner air bag body 34 into the space 48 increases and the quantity of gas escaping from the vent holes 46 of the outer air bag body 32 outside the air bag body also increases, and therefore, reaction force applied from the air bag body to the vehicle occupant when the vehicle occupant abuts against the outer air bag body 32 does not become large.

Figure 3B:
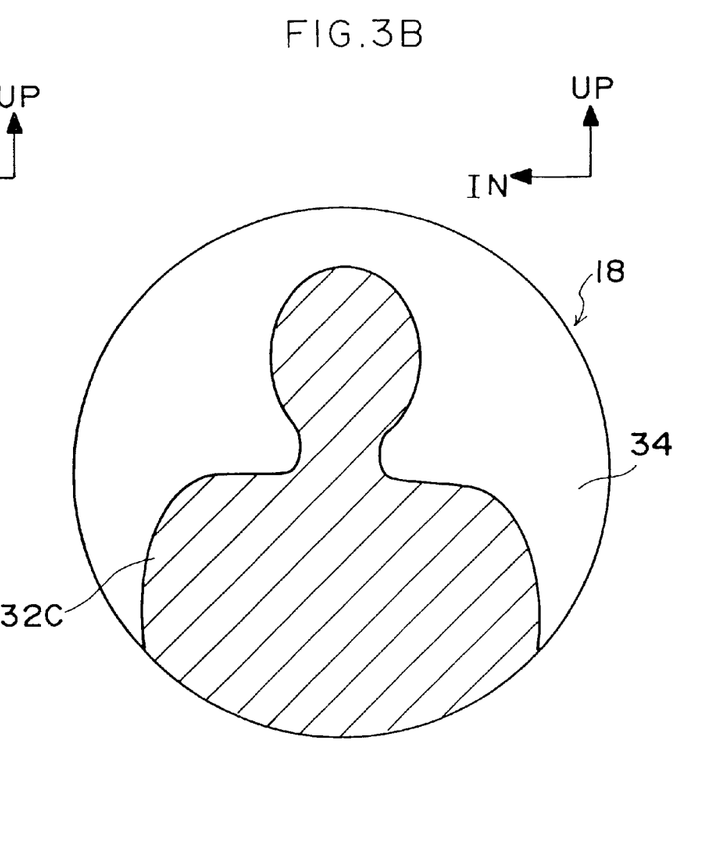
FIG. 3B is a drawing for illustration of an operation in a case in which a largely-built vehicle occupant abuts against the air bag device according to the embodiment of the present invention.

On the other hand, as shown in FIG. 3B, in a case in which a largely-built vehicle occupant abuts against the outer air bag body 32, an area of the abutting portion 32C of the outer air bag body 32 on the inner air bag body 34 (indicated by the slanting lines in FIG. 3B) is large and the number of vent holes 40 closed by the abutting portion 32C is also large. Therefore, a region through which the gas is allowed to flow becomes small, that is, the number of vent holes 40 through which gas is allowed to flow decreases. As a result, the quantity of gas flowing from the inner air bag body 34 into the space 48 decreases and the quantity of gas escaping from the vent holes 46 of the outer air bag body 32 to an exterior of the air bag body also decreases, and therefore, reaction force applied from the air bag body to the vehicle occupant when the vehicle occupant abuts against the outer air bag body 32 does not become small.

Accordingly, in the air bag device of the present embodiment, suitable reaction force corresponding to the physical constitution of a vehicle occupant abutting against the air bag body 18 can be generated.

In the present embodiment, as illustrated in FIG. 1, the end 50A of each strap 50 is fixed to the portion 34B of the inner air bag body 34 substantially facing the vent hole 46, and therefore, there is little possibility that the inner air bag body 34 abuts against peripheries of the vent holes 46 formed in the outer air bag body 32 so as to prevent the gas flowing into the space 48 from escaping from the air bag body 18 via the vent holes 46.

Further, in the present embodiment, the inner air bag body 34 is made of the cloth material 42 in which a large number of vent holes 40 are formed, and therefore, suitable reaction force which corresponds to the physical constitution of a vehicle occupant abutting against the air bag body 18 can be generated by a simple structure.

Figure 5:
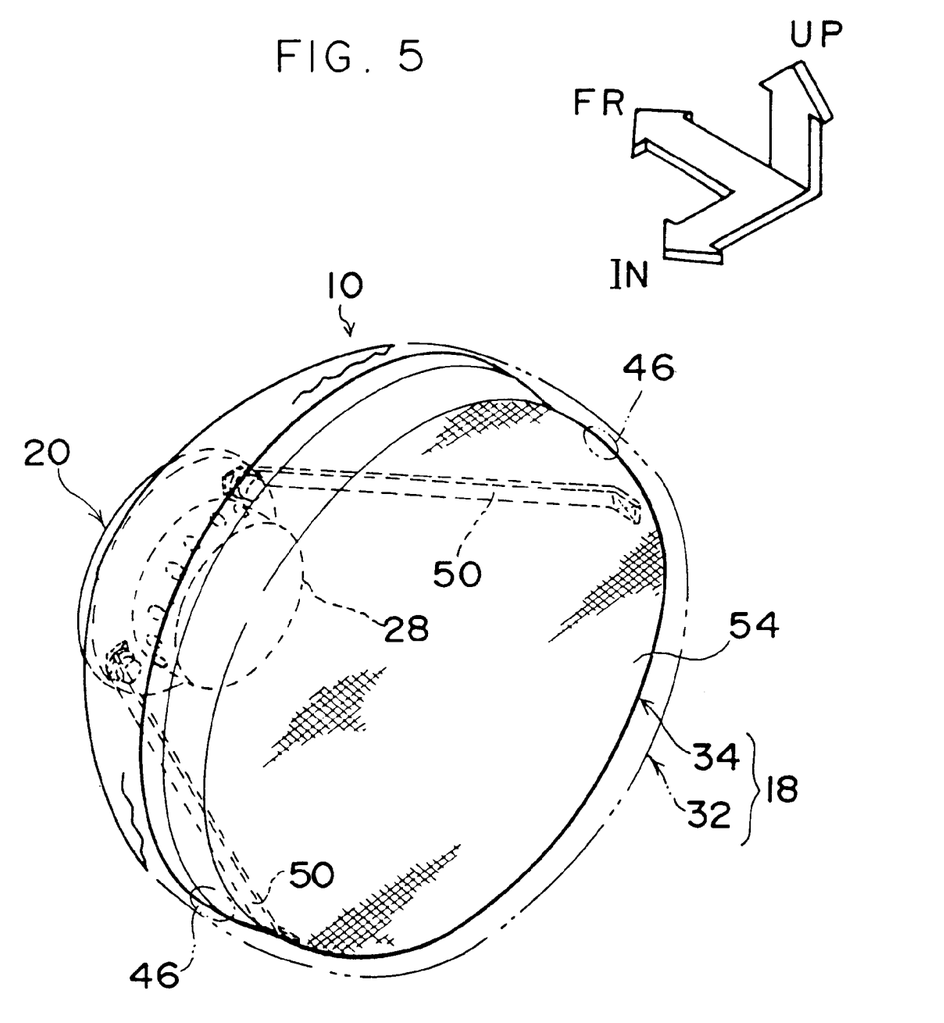
FIG. 5 is a perspective view showing an air bag device according to a modified example of the embodiment of the present invention when seen from a vehicle-interior side and also diagonally from a rear side of a vehicle.

In the foregoing, while the present invention has been particularly shown and described in detail with reference to one preferred embodiment, it will be understood by those skilled in the art that various modifications may be made within the spirit and scope of the invention. For example, the above-described embodiment is provided such that the inner air bag body 34 is made of the cloth material 42 in which a large number of vent holes 40 are formed, but as shown in FIG. 5, the inner air bag body 34 may be made of a meshed (coarsely woven) cloth material 54 as the cloth material having a high gas permeability.

Further, in the above-described embodiment, the air bag device of the present invention is applied to the air bag device 10 for a driver's seat, which is provided to unfold in a region at the front side of the vehicle occupant 16 seated in the driver's seat 14. However, the air bag device of the present invention can also be applied to an air bag device 64 for a front passenger's seat, which is provided to unfold in a region at the front of a vehicle occupant 62 seated in a front passenger's seat. Moreover, the air bag device of the present invention can be applied to other various air bag devices, for example, a side air bag device in which an air bag body accommodated along a front pillar and a roof side rail expands to unfold along a side portion of the interior of a vehicle similarly to a curtain or in a tubular form, a side air bag device in which an air bag body accommodated in a seat or in a side door expands to unfold along an vehicle-interior side portion of the side door, and the like.

The present invention discloses an air bag device having an air bag body which expands to unfold in an interior of a vehicle, the air bag body comprising: an outer air bag body having vent holes communicating with an exterior of the air bag body; and an inner air bag body having a capacity smaller than that of the outer air bag body and unfolding in an interior of the outer air bag body, wherein the inner air bag body is formed so as to have a high gas permeability, and when a vehicle occupant abuts against the outer air bag body, a portion of the outer air bag body pressed by the vehicle occupant abuts the inner air bag body so as to control a quantity of gas flowing from the inner air bag body into the outer air bag body.

Accordingly, there is an excellent effect in that suitable reaction force which corresponds to a physical constitution of a vehicle occupant abutting against an air bag body can be generated.

The present invention discloses an air bag device in which the inner air bag body is made of a cloth material having a large number of vent holes formed therein.

Accordingly, there is an excellent effect in that suitable reaction force which corresponds to a physical constitution of a vehicle occupant abutting against an air bag body can be generated by a simple structure.

The present invention discloses an air bag device in which the inner air bag body is made of a cloth material having a high gas permeability.

Accordingly, there is an excellent effect in that suitable reaction force which corresponds to a physical constitution of a vehicle occupant abutting against an air bag body can be generated by a simple structure.

The present invention discloses an air bag device having an air bag body which unfolds in an interior of a vehicle, the air bag body comprising: an outer air bag body; and an inner air bag body having a capacity smaller than that of the outer air bag body and unfolding in an interior of the outer air bag body, wherein the outer air bag body includes at least one first hole formed therein, and the inner air bag body includes communication means which is formed at least on a facing surface thereof substantially facing a vehicle occupant at the time of unfolding the air bag body, the communication means being provided to allow communication between an interior of the inner air bag body and a space formed between the inner air bag body and the outer air bag body.

Accordingly, there is an excellent effect in that suitable reaction force which corresponds to a physical constitution of a vehicle occupant abutting against an air bag body can be generated.

What is claimed is:

1. An air bag device having an air bag body which expands to unfold in an interior of a vehicle, said air bag body comprising:
    an outer air bag body having a low permeability contact area facing a vehicle occupant when unfolded and vent holes spaced from the contact area and communicating with an exterior of said air bag body; and
    an inner air bag body having a capacity smaller than that of said outer air bag body and unfolding in an interior of said outer air bag body,
    said inner air bag body being formed with a high gas permeability at a surface of the inner air bag body facing a vehicle occupant and the contact area of the outer air bag body at the time the air bag body unfolds,
    wherein when the vehicle occupant abuts against said outer air bag body, a portion of the contact area of said outer air bag body pressed by the vehicle occupant abuts said inner air bag body so as to control the quantity of gas flowing from said inner air bag body into said outer air bag body and out through the vent holes.

2. An air bag device according to claim 1, wherein said inner air bag body is made of a cloth material having a large number of vent holes formed therein.

3. An air bag device according to claim 1, wherein said inner air bag body is made of a cloth material having a high gas permeability.

4. An air bag device having an air bag body which unfolds in an interior of a vehicle, said air bag body comprising:
    an outer air bag body having a low permeability contact area facing a vehicle occupant when unfolded and at least one first hole spaced from the contact area; and
    an inner air bag body having a capacity smaller than that of said outer air bag body and unfolding in an interior of said outer air bag body,
    wherein said inner air bag body includes a plurality of second holes formed at least on a surface thereof substantially facing the contact area and a vehicle occupant at the time of unfolding the air bag body, said plurality of second holes being provided to allow communication between the interior of said inner air bag body and a space formed between said inner air bag body and said outer air bag body.

5. An air bag device according to claim 4, wherein at the time of unfolding said air bag body, in accordance with a number of said second holes closed by said outer air bag body pressed by the vehicle occupant, a quantity of gas flowing from the interior of said inner air bag body into the space formed between said inner air bag body and said outer air bag body is adjusted.

6. An air bag device according to claim 4, wherein at least said surface of said inner bag body substantially facing the vehicle occupant is air-permeable cloth.

7. An air bag device according to claim 6, wherein at the time of unfolding said air bag body, in accordance with an area of said cloth member abutted by said outer air bag body pressed by the vehicle occupant, a quantity of gas flowing from the interior of said inner air bag body into the space formed between said inner air bag body and said outer air bag body is adjusted.

8. An air bag device according to claim 4, wherein at the time of unfolding said air bag body, due to a portion of the contact area of said outer air bag body being pressed by the vehicle occupant into abutment with an abutted portion of said inner air bag body, a portion of the plurality of second holes formed on said abutted portion do not pass gas from the interior of said inner bag body to the space formed between said inner air bag body and said outer bag body.

9. An air bag device according to claim 8, wherein due to a change of an area of said abutted portion in accordance with a physical constitution of the vehicle occupant abutting said outer air bag body, a quantity of gas flowing from the interior of said inner air bag body into the space formed between said inner air bag body and said outer air bag body is adjusted.

10. An air bag device according to claim 4, wherein the first hole allows communication between a space which is formed between said inner air bag body and said outer air bag body, and an exterior of said outer air bag body.

11. An air bag device according to claim 4, further comprising prevention means which prevents said inner air bag body from abutting the first hole formed in said outer air bag body at the time of unfolding the air bag body.

12. An air bag device according to claim 11, wherein said prevention means is formed in such a manner that one end thereof is fixed to a portion of said inner air bag body in the vicinity of the first hole at the time of unfolding said air bag body, and another end is fixed to one of an inflator for unfolding said air bag body and a portion in the vicinity of the inflator.

13. An air bag device having an air bag body which unfolds in an interior of a vehicle, said air bag body comprising:

an outer air bag body having a low permeability contact area facing a vehicle occupant when unfolded and at least a first hole spaced from the contact area; and an inner air bag body having a capacity smaller than that of said outer air bag body and unfolding in an interior of said outer air bag body, wherein said inner air bag body includes a coarsely woven or meshed cloth material on at least a surface thereof substantially facing the contact area and a vehicle occupant at the time of unfolding the air bag body, said coarsely woven or meshed cloth material being provided to allow gas flow between an interior of said inner air bag body and a space formed between said inner air bag body and said outer air bag body.

14. An air bag device according to claim 13, wherein at the time of unfolding said air bag body, due to a portion of the contact area of said outer air bag body being pressed by the vehicle occupant into abutment with an abutted portion of said inner air bag body, a portion of said coarsely woven or meshed material cloth does not pass a gas from the interior of said inner air bag body to the space formed between said inner air bag body and said outer air bag body.

* * * * *

UNITED STATES PATENT AND TRADEMARK OFFICE
CERTIFICATE OF CORRECTION

PATENT NO.    : 6,419,267 B1
DATED         : July 16, 2002
INVENTOR(S)   : Syuzo Hashimoto et al.

It is certified that error appears in the above-identified patent and that said Letters Patent is hereby corrected as shown below:

<u>Title page,</u>
Item [56], References Cited, OTHER PUBLICATIONS, insert
-- Japan Automobile Manufacturers' Association, "Compilation of Automotive Technology Abstracts," Issue No. 94660, November 30, 1994 --

Signed and Sealed this

Twelfth Day of November, 2002

Attest:

Attesting Officer

JAMES E. ROGAN
*Director of the United States Patent and Trademark Office*